(12) United States Patent
Wang

(10) Patent No.: US 6,332,735 B1
(45) Date of Patent: Dec. 25, 2001

(54) BICYCLE HEADSET ASSEMBLY WITH A CIRCULAR COVER HAVING TAPERED TABS

(75) Inventor: Fu-Chun Wang, Taichung (TW)

(73) Assignee: Tien Hsin Industries Co. Ltd. (TW)

( * ) Notice: Subject to any disclaimer, the term of this patent is extended or adjusted under 35 U.S.C. 154(b) by 0 days.

(21) Appl. No.: 09/497,526

(22) Filed: Feb. 4, 2000

(51) Int. Cl.[7] .................................................. B62K 21/18
(52) U.S. Cl. ......................... 403/371; 280/279; 74/551.1
(58) Field of Search .................................. 403/370, 371, 403/368, 372, 373; 74/551.1; 280/279, 280; 384/545

(56) References Cited

U.S. PATENT DOCUMENTS

| | | | |
|---|---|---|---|
| 1,409,748 | * 3/1922 | Meiselbach | 280/279 |
| 3,917,425 | * 11/1975 | Allaben, Jr. | 403/371 |
| 4,341,394 | * 7/1982 | Cabeza | 280/279 |
| 4,593,924 | * 6/1986 | Cabeza | 280/279 |
| 5,246,296 | * 9/1993 | Chi | 280/279 X |
| 5,330,220 | * 7/1994 | Nagano | 280/279 |
| 5,387,255 | * 2/1995 | Chiang | 74/551.1 |
| 5,405,202 | * 4/1995 | Chi | 280/279 X |
| 5,496,126 | * 3/1996 | Lin | 403/370 |
| 5,647,584 | 7/1997 | Chen | 403/370 |
| 5,810,380 | * 9/1998 | Lin | 280/279 |
| 5,893,574 | * 4/1999 | Campagnolo | 280/279 |
| 5,918,895 | * 7/1999 | Chi | 280/279 |
| 5,921,700 | * 7/1999 | Haver et al. | 403/371 |
| 5,964,474 | * 10/1999 | Chen | 280/279 |
| 6,126,323 | * 10/2000 | Tange | 384/545 |

FOREIGN PATENT DOCUMENTS

2261348 * 8/1955 (DE) .

* cited by examiner

*Primary Examiner*—Harry C. Kim
(74) *Attorney, Agent, or Firm*—Bacon & Thomas, PLLC

(57) ABSTRACT

A bicycle headset. The bicycle headset includes an upper bearing cover and a tapered ring that are made integrally in the form of a hollow arcuate circular ring capable of being fastened with precision.

4 Claims, 7 Drawing Sheets

BICYCLE HEADSET ASSEMBLY WITH A CIRCULAR COVER HAVING TAPERED TABS

BACKGROUND OF THE INVENTION

1. Field of the Invention

The present invention relates generally to a bicycle, and more particularly to a headset of the bicycle.

2. Description of the Prior Art

As shown in FIGS. 1A–1B a prior art bicycle headset comprises a bearing set 2A having an upper bearing cover 3A and a tapered ring 4A, which are separately assembled such that their centers can not be easily aligned, and that the upper bearing and lower bearing do not turn smoothly, and further that the component parts are apt to have gaps.

As shows in FIG. 2, another prior art bicycle headset comprises a cylindrical fastening sleeve, two symmetrical conical shaft keys, and an elastic tapered ring. The horizontal angles of the upper bearing and the lower bearing cooperate well so as to result in a smooth rotation of the upper bearing and the lower bearing. However, the arcuate restraining rings 50 and 52 of the prior art headset can not be fastened securely.

Moreover, the prior art bicycle headset is formed of numerous component parts and is therefore not cost-effective.

SUMMARY OF THE INVENTION

The primary objective of the present invention is to provide a bicycle with an improved headset which is free from the deficiencies of the prior art bicycle headsets described above.

The features and the functions of the present invention will be readily understood upon a thoughtful deliberation fo the following detailed description of a preferred embodiment of the present invention with reference to the accompanying drawings.

BRIEF DESCRIPTION OF THE PREFERRED EMBODIMENT

Figure 1A:
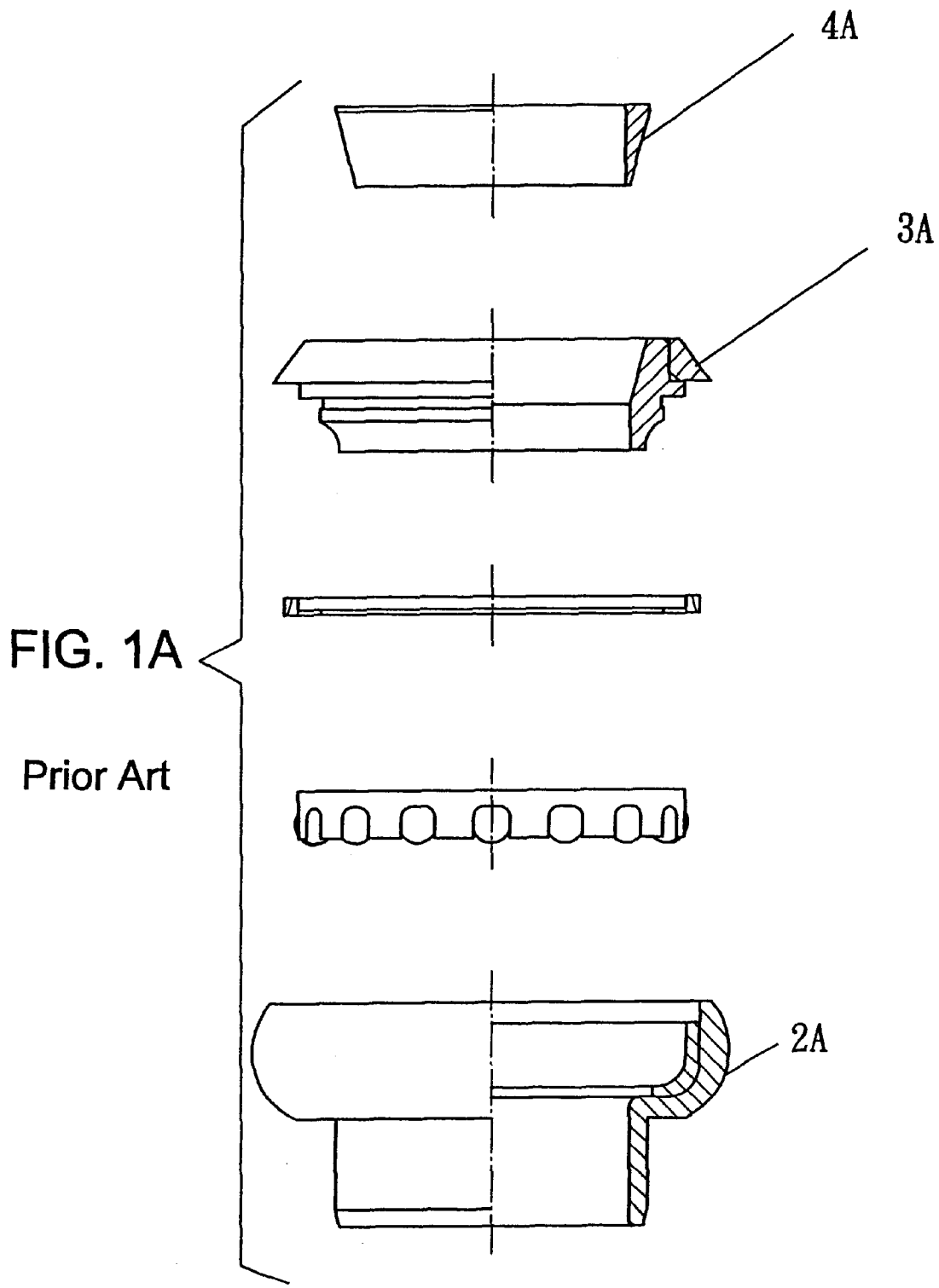
FIG. 1A shows an exploded view, partially in section, of a prior art bicycle headset.
Figure 1B:
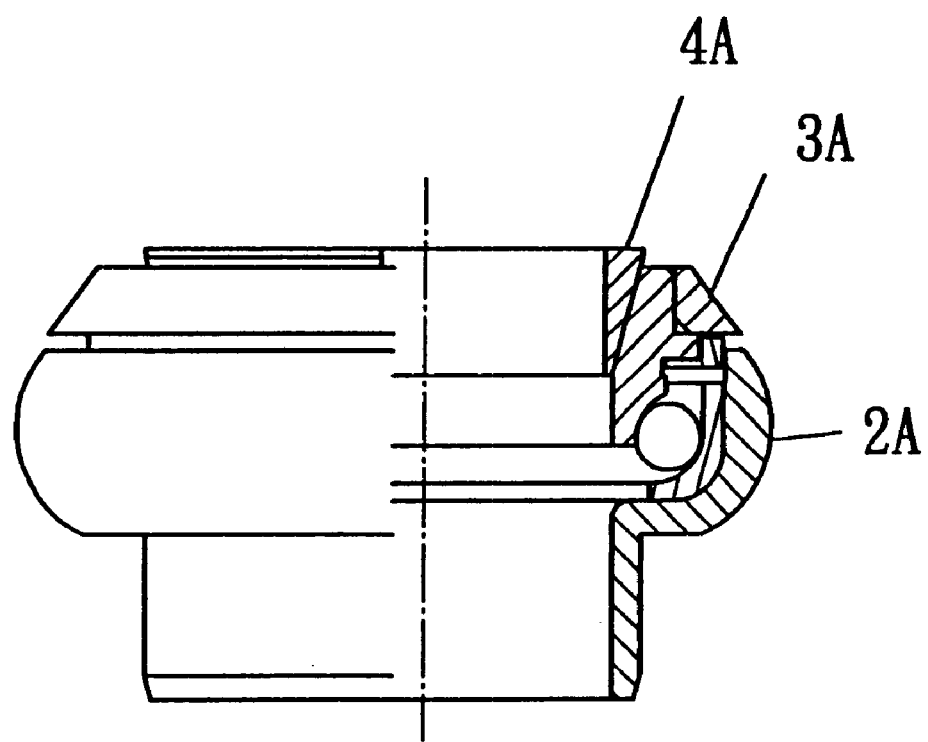
FIG. 1B shows a schematic view, partially in section, of an assembled bicycle headset of FIG. 1A.
Figure 2:
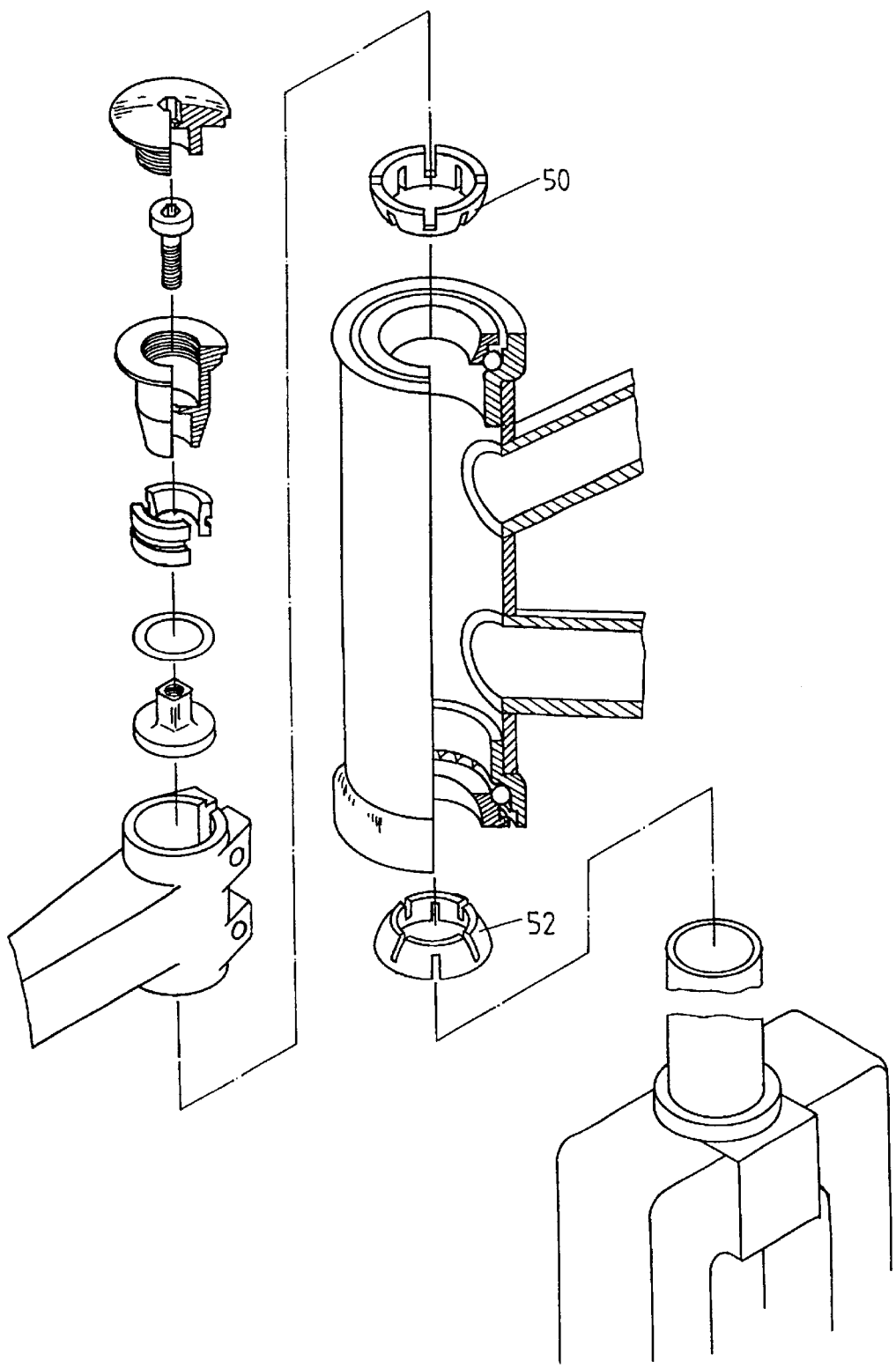
FIG. 2 shows an exploded view of another prior art bicycle headset.
Figure 3B:
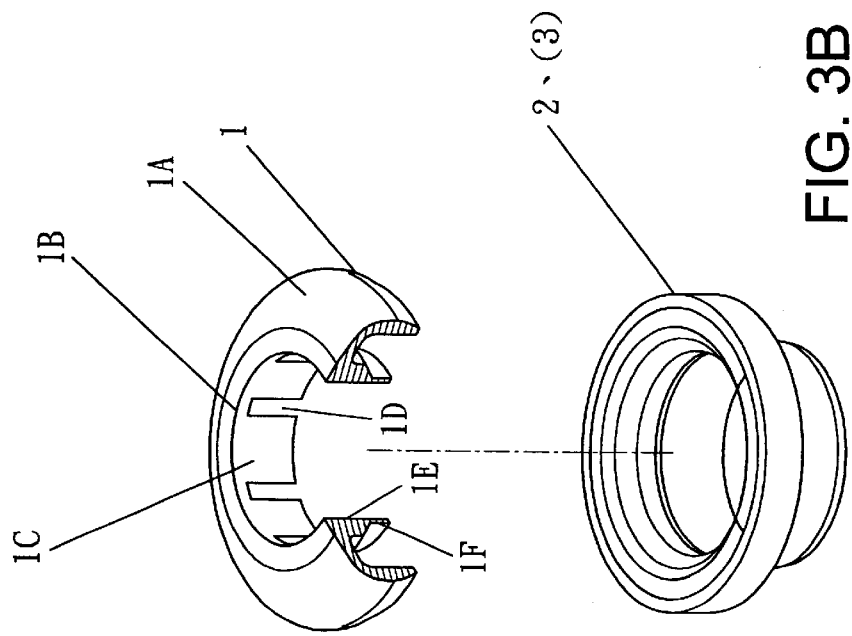
FIG. 3B shows a schematic perspective view of a bearing set of the assembled preferred embodiment of the present invention, with a sectional schematic view of a hollow arcuate cover of the preferred embodiment of the present invention.
Figure 3A:
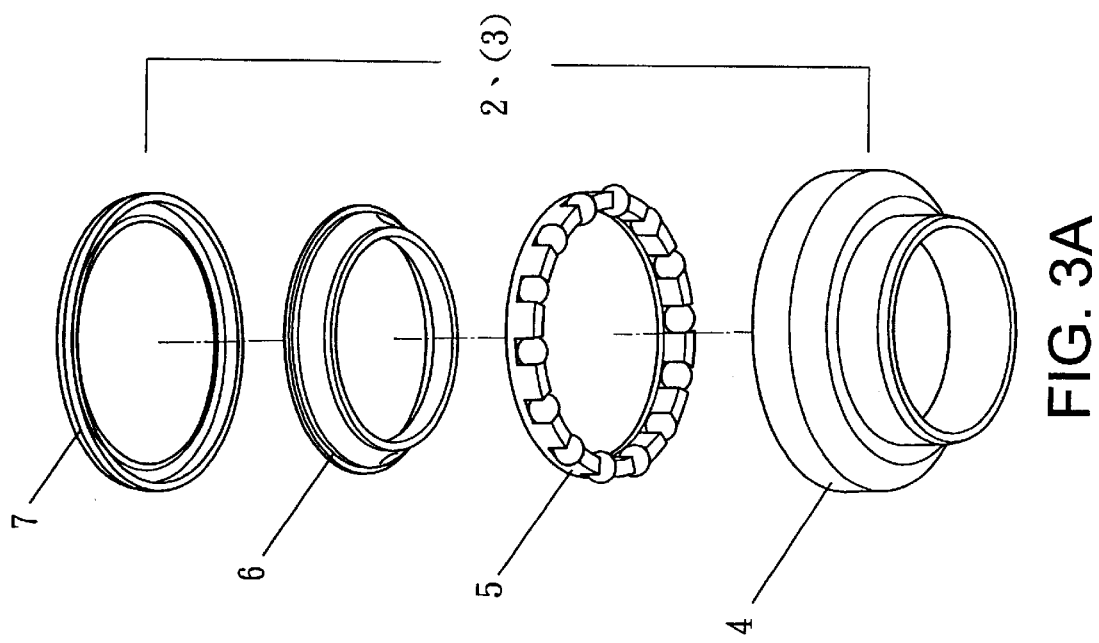
FIG. 3A shows an exploded view of a bearing set of the preferred embodiment of the present invention.
Figure 4:
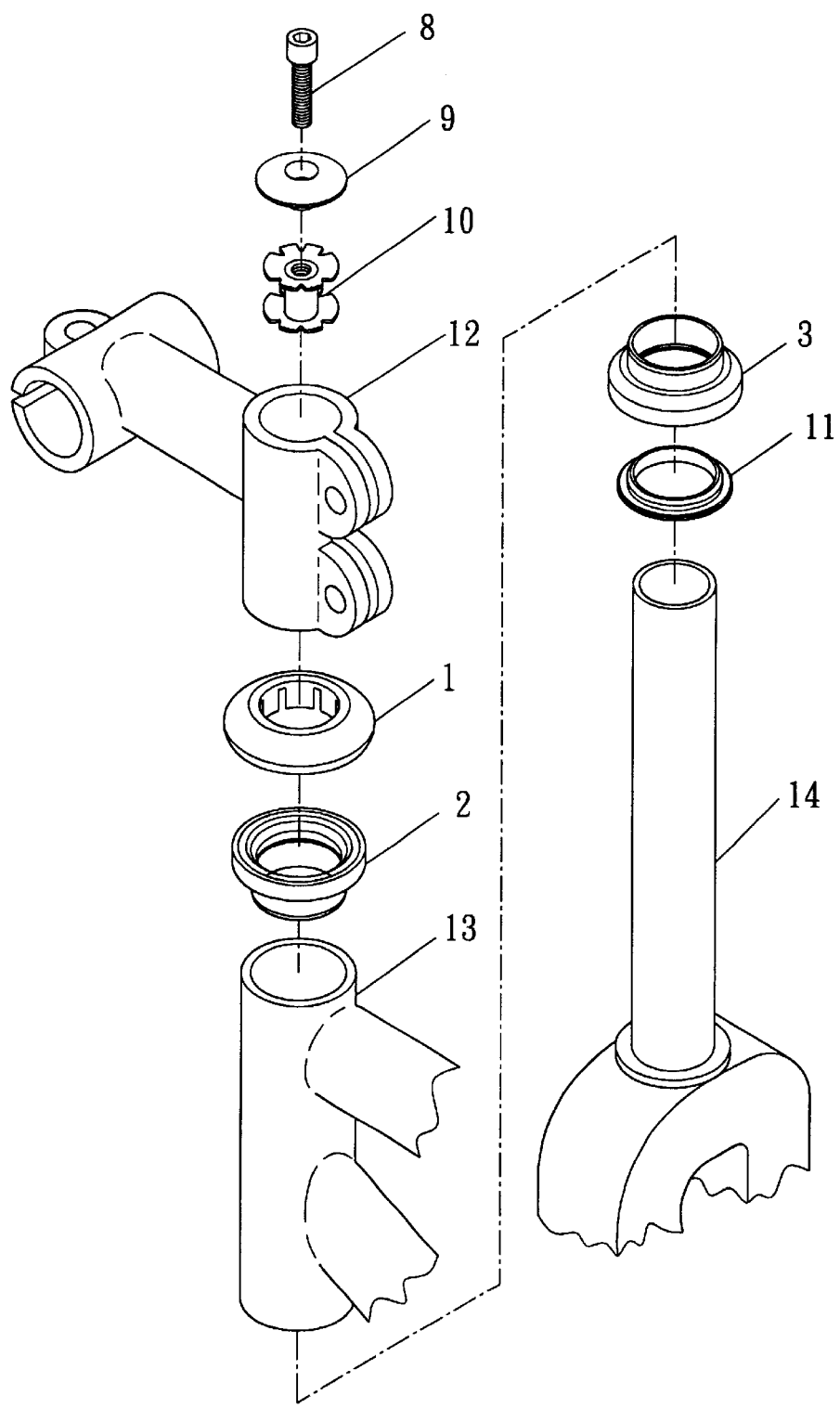
FIG. 4 shows a schematic perspective view of the preferred embodiment of the present invention.

As shown in FIGS. 3A, 3B, and 4, a bicycle headset embodied in the present invention is formed of a hollow arcuate circular cover 1, an upper bearing set 2, and a lower bearing set 3. The upper and the lower bearing sets 2 and 3 comprise a bearing seat 4, a ball 5, a ball rail 6, and a waterproof cover 7. The present invention is characterized by the hollow arcuate circular cover 1 which is made integrally and is provided in the outer side thereof with an arcuate cover 1A and in the inner edge thereof with a hollow ring 1B. The hollow arcuate circular cover 1 is further provided in the inner edge thereof with a plurality of symmetrical inclined tapered tabs 1C. Located between the tabs 1C is a tangential groove 1D. The rear tapering angle of the tabs 1C which jointly define a circular and discrete surface that coincides with the tapering angle of the ball rail 6 such that each of the tabs 1C is provided with a first end 1E and a free end 1F, which has a thickness less than that of the first end 1E.

Figure 5:
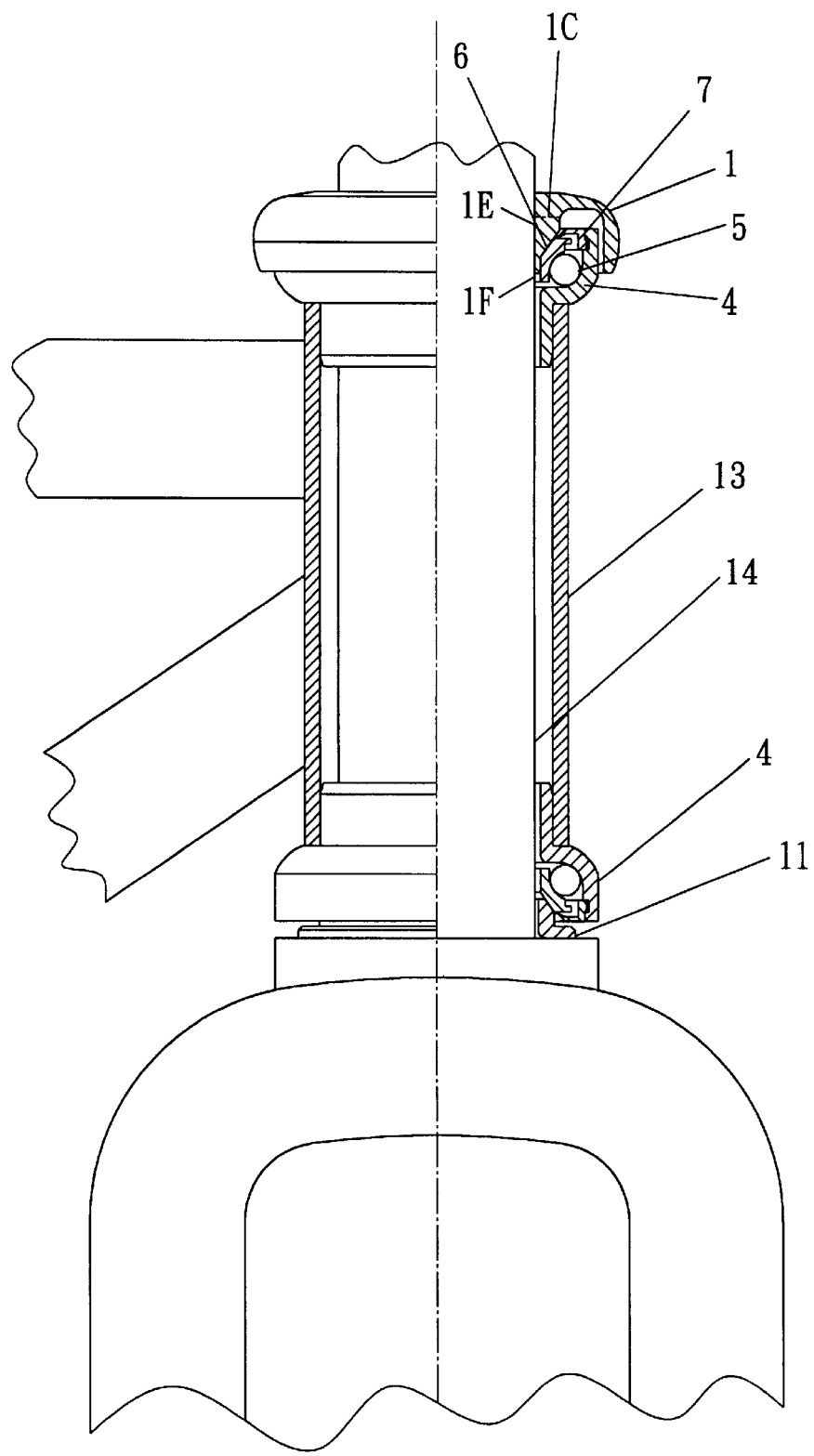
FIG. 5 shows a sectional schematic view of the preferred embodiment of the present invention.
Figure 6:
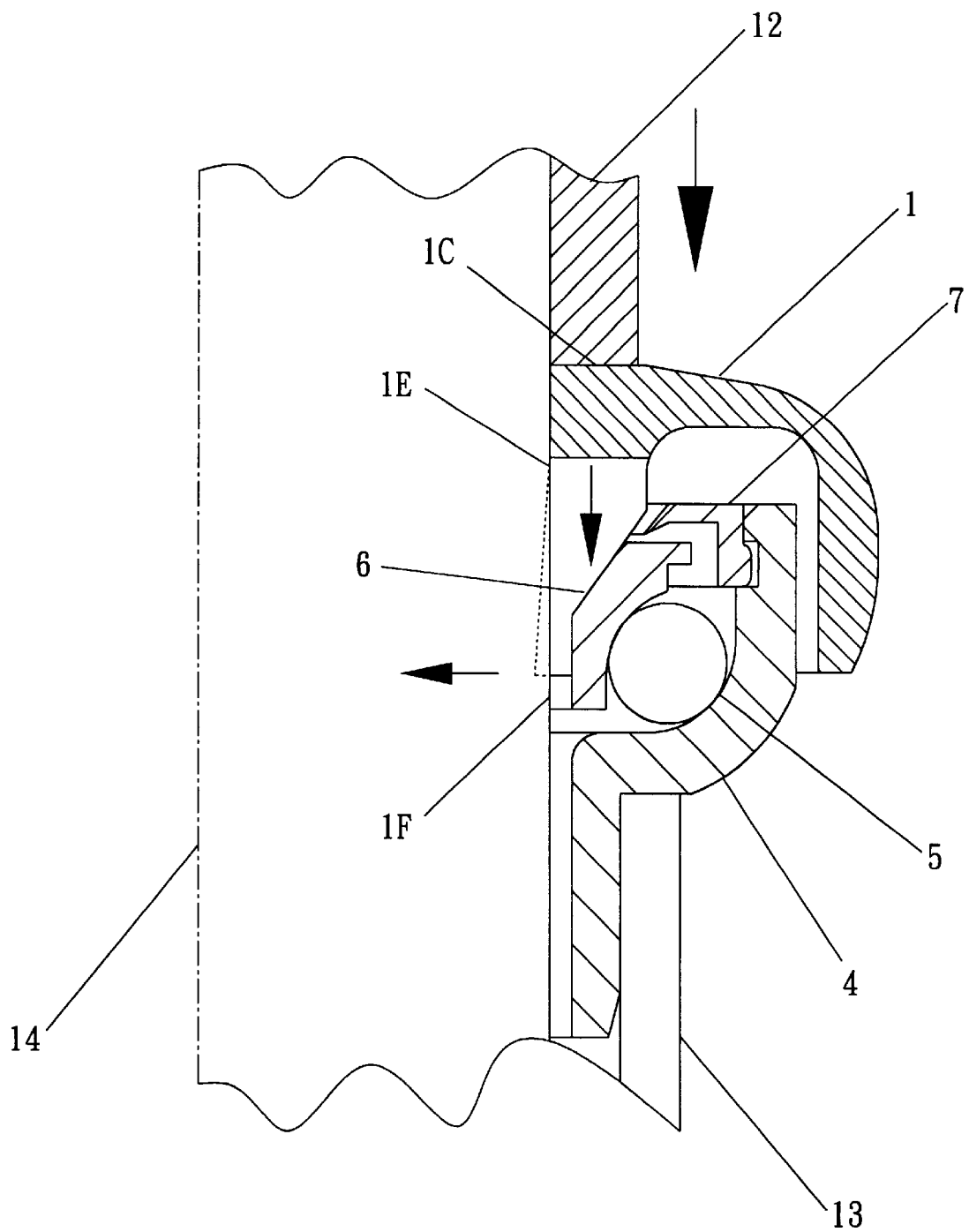
FIG. 6 shows a sectional schematic view of the preferred embodiment of the present invention in action.

As shown in FIGS. 4 and 5, the preferred embodiment of the present invention is assembled such that a head tube 12 is fastened with an elastic piece 10 in conjunction with a bolt and a bolt cover 9, and that the hollow arcuate circular cover 1, the upper bearing set 2, the head tube 12, the lower bearing set 3, the lower bearing set cover 11, the frame 13 are sequentially fitted into the front fork 14 before fastening the bolt 8. It must be noted here that the hollow arcuate circular cover 1 is integrally made of a reinforced plastic material, and that the hollow arcuate circular cover 1 is provided in the inner edge thereof with a plurality of symmetrical inclined tapered tabs 1C and tangential grooves 1D located between the tabs 1C. In addition, the rear tapering angle of the tabs 1C coincides with the tapering angle of the ball rail 6 such that the tabs 1C are provided with the first end 1E and the free end 1F. Now referring to FIG. 6, when the present invention is applied with a downward force, the first end 1E and the free end 1F of the tabs 1C are in an intimate contact with the tapered surface of the ball rail 6, thereby resulting in the formation of a strong vertical force and a horizontal strong force, which are canceled out by each other. As a result, the inner arcuate surfaces of the upper bearing set 2 and the lower bearing set 3 embrace securely the wall of the front fork 14 to result in the automatic alignment of the centers of the horizontal angles with precision. The upper bearing set 2 and the lower bearing set 3 can thus turn smoothly. In other words, the head tube 12, the frame 13, and the front fork 14 are securely fastened together.

It must be emphasized here that the hollow arcuate circular cover 1 of the present invention is made integrally in contrast to the prior art upper bearing cover 3A and the tapered ring 4A, which are made separately and assembled separately.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A bicycle headset assembly comprising:
   a fork tube;
   a lower bearing cover with a lower bearing set assembled to said fork tube;
   a frame tube moveably assembled to said fork tube and having a lower end rested onto said lower bearing set;
   an upper bearing cover having an upper bearing set assembled to said fork tube and rested on an upper end of said frame tube;

a hollow arcuate circular cover having an outer cover, and a plurality of tapered tabs extending downward from an inner rim portion of said outer cover, each said tab including a first end and a free end having a thickness less than that of said first end;

a head tube assembled to said fork tube and rested onto said hollow arcuate circular cover;

a locking bolt and bolt cover adapted to press said head tube toward said arcuate circular cover; and wherein said free ends of said tabs of said circular cover are inserted into a gap defined between said upper bearing set and said fork tube thereby securely positioning said upper bearing set with respect to said upper bearing cover and accurately aligning said fork tube with respect to said upper bearing set.

2. The bicycle headset assembly as claimed in claim 1, wherein the tapered tabs each comprises an internal face that is substantially curved around the periphery of the inner rim portion of said outer cover.

3. The bicycle headset assembly as claimed in claim 1, wherein each of the first ends of the tapered tabs includes an oblique conical face at an outer side thereof, and the first end is thicker than the free end of the respective one of the tapered tabs.

4. The bicycle headset assembly as claimed in claim 3, wherein when the oblique conical faces of the tapered tabs are forced downward into said fork tube, they abut against an internal conical face of a ball rail, such that the free ends of tapered tabs are forced toward the ball rail to provide an abutment force that prevents sliding between the ball rail and the tapered tabs.

\* \* \* \* \*